United States Patent
Zerulla et al.

(10) Patent No.: US 10,485,162 B2
(45) Date of Patent: Nov. 26, 2019

(54) METHOD AND VEHICLE FOR APPLYING AN AGROCHEMICAL MIXTURE TO A WORKING AREA OF A FIELD

(71) Applicant: BASF SE, Ludwigshafen am Rhein (DE)

(72) Inventors: Wolfram Zerulla, St. Martin (DE); Markus Schmid, Deidesheim (DE); Gregor Pasda, Neustadt (DE)

(73) Assignee: BASF SE, Ludwigshafen am Rhein (DE)

(*) Notice: Subject to any disclaimer, the term of this patent is extended or adjusted under 35 U.S.C. 154(b) by 70 days.

(21) Appl. No.: 15/560,508

(22) PCT Filed: Mar. 22, 2016

(86) PCT No.: PCT/EP2016/056242
§ 371 (c)(1),
(2) Date: Sep. 22, 2017

(87) PCT Pub. No.: WO2016/150952
PCT Pub. Date: Sep. 29, 2016

(65) Prior Publication Data
US 2018/0249626 A1    Sep. 6, 2018

(30) Foreign Application Priority Data

Mar. 26, 2015 (EP) .................................... 15161117
Jun. 23, 2015 (EP) .................................... 15173320

(51) Int. Cl.
*G06F 19/00* (2018.01)
*A01C 21/00* (2006.01)
(Continued)

(52) U.S. Cl.
CPC ............ *A01C 21/007* (2013.01); *A01C 15/00* (2013.01); *A01C 21/00* (2013.01); *A01C 23/007* (2013.01);
(Continued)

(58) Field of Classification Search
CPC ... A01C 23/007; A01C 23/047; A01C 21/007; A01C 15/00; C05G 3/08
See application file for complete search history.

(56) References Cited

U.S. PATENT DOCUMENTS

| 3,875,876 A | 4/1975 | Pustovoit et al. |
| 5,385,596 A | 1/1995 | Makkink |

(Continued)

FOREIGN PATENT DOCUMENTS

| DE | 19860306 A1 | 3/2000 |
| EP | 0078131 A1 | 5/1983 |

(Continued)

OTHER PUBLICATIONS

International Search Report and Written Opinion for International Patent Application No. PCT/EP2016/056242, dated Oct. 26, 2016, 18 pages.

*Primary Examiner* — Kidest Bahta
(74) *Attorney, Agent, or Firm* — Armstrong Teasdale LLP

(57) ABSTRACT

A method for applying an agrochemical mixture to a working area of a field using a vehicle moving on the field is described. Thereby, a solid fertilizer is spread on the working area using a fertilizer spreading device mounted on the vehicle and a liquid fertilizer additive is sprayed on the working area using a field sprayer, mounted on the vehicle separately from the fertilizer spreading device. Therein, the liquid fertilizer additive is prevented from coming into contact with surfaces of the fertilizer spreading device, which also come into contact with the solid fertilizer.

(Continued)

Moreover, a vehicle for applying an agrochemical mixture to a working area of a field while moving on the field is also described.

12 Claims, 4 Drawing Sheets

(51) Int. Cl.
    *A01C 15/00*     (2006.01)
    *A01C 23/04*     (2006.01)
    *A01C 23/00*     (2006.01)
    *C05G 3/08*     (2006.01)

(52) U.S. Cl.
    CPC ............ *A01C 23/04* (2013.01); *A01C 23/047* (2013.01); *C05G 3/08* (2013.01); *Y02P 60/214* (2015.11)

(56) References Cited

U.S. PATENT DOCUMENTS

| | | | |
|---|---|---|---|
| 6,070,539 | A | 6/2000 | Flamme et al. |
| 6,199,000 | B1 | 3/2001 | Keller et al. |
| 6,444,975 | B1 | 9/2002 | Reusch |
| 8,075,659 | B2 | 12/2011 | Wissemeier et al. |
| 8,321,061 | B2* | 11/2012 | Anderson ............... A01G 25/00 700/284 |
| 2009/0120339 | A1* | 5/2009 | Detweiler ............... A01N 25/08 111/118 |
| 2011/0036923 | A1* | 2/2011 | Zunhammer ........ A01C 23/045 239/63 |
| 2013/0111960 | A1* | 5/2013 | Wells ........................ C05B 3/00 71/23 |
| 2013/0253752 | A1* | 9/2013 | Grabow ............... G05D 1/0278 701/25 |
| 2013/0306754 | A1* | 11/2013 | Easton .................. A01C 15/005 239/142 |
| 2014/0208815 | A1* | 7/2014 | Kaiser, II ............... C05G 3/007 71/32 |
| 2015/0305232 | A1* | 10/2015 | Rosenbaum ......... A01C 23/047 239/164 |
| 2016/0000003 | A1 | 1/2016 | Wendte et al. |
| 2016/0316759 | A1 | 11/2016 | Bougoure et al. |
| 2017/0036969 | A1 | 2/2017 | Nave et al. |
| 2017/0158575 | A1 | 6/2017 | Schneider et al. |
| 2017/0181435 | A1 | 6/2017 | Nave et al. |
| 2017/0223964 | A1 | 8/2017 | Nave et al. |
| 2017/0313631 | A1 | 11/2017 | Nave et al. |

FOREIGN PATENT DOCUMENTS

| | | |
|---|---|---|
| EP | 0119487 A1 | 9/1984 |
| WO | 2007093528 A1 | 8/2007 |
| WO | 2013121384 A2 | 8/2013 |
| WO | 2016103168 A1 | 6/2016 |
| WO | 2016124769 A1 | 8/2016 |

* cited by examiner

METHOD AND VEHICLE FOR APPLYING AN AGROCHEMICAL MIXTURE TO A WORKING AREA OF A FIELD

CROSS-REFERENCE TO RELATED APPLICATIONS

This application is a U.S. National Phase Application of International Patent Application No. PCT/EP2016/056242, filed Mar. 22, 2016, which claims the benefit of priority to European Patent Application No. 15161117.5, filed Mar. 26, 2015, and to European Patent Application No. 15173320.1, filed Jun. 23, 2015, the entire contents of which are hereby incorporated by reference herein.

BACKGROUND

The present invention relates to a method for applying an agrochemical mixture to a working area of a field using a vehicle moving on the field. Moreover, the invention relates to a vehicle for applying an agrochemical mixture to a working area of a field while moving on the field.

Using energy from the sun, a plant produces carbohydrates from $CO_2$ and water. All chemical elements essential to the plant's nutrition and productivity are either mineral or non-mineral plant nutrients. The plant uses minerals to produce protein, fat, enzymes, phytohormones and vitamins. Non-mineral nutrients include carbon, hydrogen and oxygen. Plants generally consume nutrients from minerals and soil, decaying organic substances (roots, straw, humus), organic fertilizers and mineral fertilizers, airborne inputs and biological nitrogen fixation. Although arable soils may contain substantial nutrient reserves, they are usually not in plant-available form. Microorganism activity and/or chemical processes result in only a small portion of nutrients being released every year and converted into water-soluble, plant-available form. When the plant's needs cannot be met by available nutrients, fertilizers provide supplemental nutrition.

The chemical element nitrogen (N) has a special role among minerals in the soil: plants need large quantities to achieve high quality and yield. Nitrogen originates under natural conditions in the soil but in contrast to all other nutrients, it does not originate from rock but from organic compounds in the soil. Nitrogen is the fourth most common element in living tissue, after carbon, hydrogen and oxygen. An essential element in amino acids and therefore proteins, nitrogen is also a key component of chlorophyll, DNA and RNA. Without nitrogen there can be no life: no organ regeneration, and no plant development or fruit and seed formation—and ultimately no yield. This is why nitrogen is commonly referred to as the engine of plant growth.

There are two large nitrogen pools in the soil: organically bound nitrogen (95%), which is not plant-available and mineral nitrogen (5%), which is present in plant-available forms. Organic fertilizers, plant residues and the nitrogen bound by legumes (e.g., soybeans, beans, and peas) flow into the organic nitrogen pool. The mineral nitrogen pool, which consists of ammonium (NH4) and nitrate (NO3), develops from nitrogen dissolved in rain and nitrogen that enters the soil through mineral fertilizers. Ammonium and nitrate are essentially the only forms of nitrogen that plants can absorb. The organic nitrogen and the mineral nitrogen pools are in a state of constant exchange. For instance, organic nitrogen is constantly being transformed into ammonium and nitrate (a process known as mineralization), while soil organisms cause the organic fixation of mineral nitrogen (immobilization). Nitrogen depletion in the soil occurs when strong rainfall causes leaching (nitrate leaching) or when, as a result of conversion processes, gaseous combinations form that escape into the atmosphere (e.g., nitrous oxide losses).

Nitrogen losses occur as a result of organic and/or mineral fertilization and tillage. These are mainly ammonia losses and losses resulting from either nitrogen leaching or the release of nitrous oxide into the atmosphere. While nitrogen losses generally result in an economic cost for the grower, they also have a negative impact on the environment.

Ammonia losses occur mainly in livestock production, specifically during organic fertilizer storage and application (dung, manure, slurry). Significant ammonia losses also occur after the application of urea-containing fertilizers. In high concentrations, ammonia gas is toxic for humans and animals. Studies show that in 2006, increased health costs associated with ammonia emissions were an estimated 36 B US$. In addition, the pungent odor is unpleasant. Ammonia is a key component of smog; it binds with other pollutants and particles, maintaining them in air layers at or around ground level. In effect, ammonia amplifies this pollution. As a nitrogen-containing gas, ammonia can be carried great distances by the wind. Rain precipitation then often injects ammonia into natural ecosystems where it acts as a nitrogen fertilizer and has the undesired effect of boosting growth. While some plant species have a stronger reaction to nitrogen fertilization and grow better, other plants are impaired in their development. In areas where the soil has a low nutrient content, this can lead to grasses taking over and suppressing the development of rare flowering plants. In short, ammonia, has a substantially negative impact on biodiversity. Once ammonia enters the soil, it is nitrified relatively quickly, depending on temperature on some days. This goes hand in hand with soil acidification, which under extreme conditions can lead to the release of toxic heavy metals that damage plants and contaminate groundwater. Ammonia can also indirectly contribute to groundwater nitrate contamination and the formation of nitrous oxide as a result of secondary reactions.

Nitrate is water-soluble. Because negatively charged soil particles predominate in soil, the negatively charged nitrate ion—unlike the positively charged ammonium ion—will not bind to soil particles. Nitrate is therefore highly mobile in the soil and can be effectively translocated in the soil profile through diffusion and surface water movements. After heavy rainfall or low plant uptake, nitrate can leach out of the soil profile and accumulate in groundwater. In humid conditions, leached nitrates translate into a significant cost for the grower. From a toxicological perspective, threshold values have been set worldwide for groundwater levels (to avoid a transformation into nitrite in case that the water is polluted by bacteria or a transformation in the human body). Excessive nitrate concentrations are suspected of causing the following illnesses: cyanosis in newborns, stomach and intestinal cancer as a result of nitrosamine formation, and goiter. Conversely, numerous studies show that nitrate boosts the body's immune system and effectively prevents numerous diseases. Nitrate is the preferred form of nitrogen for plants, which is why nitrate in surface water bodies stimulates water plant and algae growth to the point of algal bloom. As algae and/or water plants decay, the resulting oxygen depletion (oxygen is consumed in the decomposition of organic substances from dead algae and plants) may, under extreme conditions, lead to mortality in fish populations.

Nitrous oxide ($N_2O$) occurs during nitrification (conversion of ammonium into nitrite and nitrate through soil bacteria) as well as when nitrate exists in the soil under oxygen-poor conditions (denitrification). Next to carbon dioxide and methane, nitrous oxide is one of the most dangerous greenhouse gases. Its global warming potential is 300 times that of $CO_2$. Nitrous oxide losses in the soil—most often only a few grams or kilograms—may represent a cost to growers as well as negative environmental impact.

The loss of nitrate and/or nitrous oxide from the soil may be reduced by a nitrification inhibitor.

One way to reduce ammonia losses is to treat urea-containing fertilizers with a urease inhibitor. A urease inhibitor effectively prevents the conversion of urea into carbamic acid and ammonia by blocking the enzyme that drives the conversion, i.e., urease. Under laboratory conditions, supplementing with urease inhibitor has been shown to prevent ammonia losses at least 70%—and in some cases 100%. The most potent known urease inhibitors include N-alkylthiophosphoric triamides and N-alkylphosphoric triamides, which are described for example in EP 0 119 487 A1.

WO 2007/093528 describes preparations with improved urease-inhibitory effect, comprising at least two different (thio)phosphoric triamides. It further describes urea-comprising fertilizers which comprise these preparations and methods for producing these preparations.

Furthermore, WO 2013/121384 describes agrochemical mixtures comprising N-n-butylthiophosphoric triamide (NBTPT) and/or N-n-propylthiophosphoric triamide (NPTPT) as a first component and at least one strobilurin as a second component in synergistically effective amounts. The application of these mixtures allows reducing ammonia and/or nitrous oxide emission from soils.

In general solid fertilizers are treated with a liquid formulation of a fertilizer additive in fertilizer plants and/or in specific application devices at fertilizer distributors and/or blenders. The ratio between fertilizer additive and fertilizer is always fixed.

One drawback of applying such agrochemical mixtures to the soil is that the ratio of fertilizer and fertilizer additive cannot be adjusted to the specific conditions, such as the soil quality and current climatic conditions.

SUMMARY

It is therefore the object of the present invention to provide a method and vehicle for applying a solid fertilizer and a liquid fertilizer additive to the soil and to allow controlling the ratio of both components.

The above-described object has been achieved by the method as defined in claim 1, the method as defined in claim 10, and the vehicle as defined in claim 5 as well as the vehicle as defined in claim 12. Further features of this method and vehicle are defined in the dependent claims.

DETAILED DESCRIPTION

Figure 1:
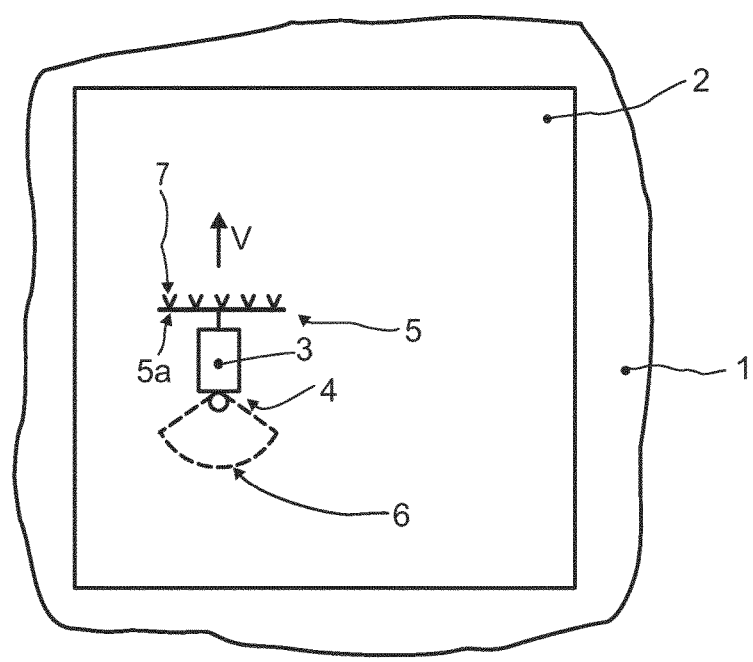
FIG. 1 shows embodiments of a vehicle according to the present invention.

According to a first aspect of the present invention the method comprises spreading a solid fertilizer on the working area using a solid fertilizer spreading device mounted on the vehicle and spraying a liquid fertilizer additive on the working area using a field sprayer, mounted on the vehicle separately from the solid fertilizer spreading device. Thereby, the liquid fertilizer additive is prevented from coming into contact with surfaces of the solid fertilizer spreading device, which also come into contact with the solid fertilizer.

One known approach to applying a fertilizer and a fertilizer additive is to use liquid compounds and mix them to the desired concentrations. However, it is much more sophisticated to mix the fertilizer with the fertilizer additive, if the fertilizer is in solid form. According to the general experience, wetting a solid fertilizer component with a liquid fertilizer additive could lead to the formation of clumps and material sticking to the fertilizer spreading device, having a negative impact for a homogeneous distribution of the material on the field. In addition to that, if the solid fertilizer spreading device gets wet, this will affect the distribution characteristics of the ejected fertilizer negatively.

Nevertheless it is generally considered necessary to mix the additive with the fertilizer prior to spreading it on the field, instead of bringing both of them subsequently onto the field. The reasoning hereby is that the liquid additive is continuously sprayed onto the field, while the solid fertilizer, e.g., in granulate form, is concentrated in discrete points on the field. Therefore, the liquid additive is mostly applied to the area between the solid fertilizer granules.

Surprisingly, it has been found that applying a for example solid nitrogen-containing fertilizer and a liquid fertilizer additive subsequently onto the field allows a great reduction of nitrogen losses from the soil. The effect is at least as good as the use of nitrogen-containing fertilizer premixed with a fertilizer additive. However, to reach the maximum effect it is necessary to apply the two compounds short after each other, preferably within a time interval of 1 h, more preferably within a time interval of few minutes, for example 5 minutes. This result was validated experimentally with the experimental results given below.

Both the solid fertilizer spreading device and the field sprayer are arranged on the same vehicle. Like this, both compounds can be applied simultaneously in one work step, thereby reducing the expenditure of time for the user. Furthermore, it ensures that both compounds can be applied to the same working area, since the solid fertilizer spreading device and the field sprayer are moving synchronously. The working area results from the working width of the solid fertilizer spreading device.

In the method of the present invention a solid fertilizer and a liquid fertilizer additive are spread on the working area of the field. One challenge is here that the liquid fertilizer additive may not come into contact with the solid fertilizer before the solid fertilizer is ejected, in order to avoid the formation of clumps or deterioration of the spreading properties. Especially, the liquid fertilizer additive has to be kept away from those parts of the solid fertilizer spreading device that come into contact with the solid fertilizer. This is realized according to the method of the invention by mounting the field sprayer and the solid fertilizer spreading device separately on the same vehicle in a suitable configuration that avoids, e.g., liquid fertilizer additive being blown towards the solid fertilizer spreading device. Wetting of the solid fertilizer component with the liquid fertilizer additive is thereby prevented. In particular, the formation of clumps and material sticking to the fertilizer spreading device is thereby prevented.

The method of the present invention allows also solving another challenge in using a mixture of fertilizer and fertilizer additive: The life times of fertilizers and fertilizer additives, e.g. nitrification inhibitors, denitrification inhibitors or urease inhibitors, can be very different. For example, inhibitors may have a limited shelf live as compared to common nitrogen-containing fertilizers. Therefore, combining both components in one formulation, e.g. by integrating and/or coating the inhibitor compound into and/or a granulate form of the fertilizer, leads to a time-dependent change in the ratio of active inhibitor compound and fertilizer content.

Furthermore, it is now possible by using the method of the present invention to change the concentrations and the ratio of fertilizer and fertilizer additive by the user, in contrast to having them combined in one product. This is desirable to allow the user optimizing the fertilization process, e.g. to specific conditions like soil quality, humidity, temperature and other climatic conditions.

According to an embodiment of the invention, the vehicle's speed is measured. The rates of spreading the solid fertilizer and spraying the liquid fertilizer additive on the working area are controlled as a function of the vehicle's speed and a longitudinal distance between the solid fertilizer spreading device, in particular an ejection opening or ejection openings of the solid fertilizer spreading device, and the field sprayer, in particular a nozzle or nozzles of the field sprayer. This is done so that a predetermined quantity of solid fertilizer and liquid fertilizer additive, respectively, is applied to each segment of the field.

This allows advantageously adjusting the quantity of both the solid fertilizer and the liquid fertilizer additive that is deposited on each segment of the field so that also the ratio of both components may be controlled. Thereby, the working area of the field is the area on which the fertilizer should be applied. This working area is divided into "segments", which represent the smallest unit area that can be treated specifically with the solid fertilizer spreading device and the field sprayer. The size of the segments depends on the geometry of the distribution that is generated by the solid fertilizer spreading device and the field sprayer. For example, the working width, in which the solid fertilizer and the liquid fertilizer additive are distributed, may vary depending on their specific configuration.

The rate at which both compounds are applied to the field can be coordinated to reach a predetermined ratio. It should be noted that the solid fertilizer and the liquid fertilizer additive are not necessarily applied to exactly the identical segment of the field at exactly the same time. For example, the solid fertilizer spreading device may be mounted at the rear of the vehicle, while the field sprayer is mounted on the front. Therefore, a specific segment of the field may first come into contact with the liquid fertilizer additive and subsequently with the solid fertilizer or the other way round.

According to another embodiment, alternatively or in addition the vehicle's geographical position is determined and the predetermined quantity of solid fertilizer and liquid fertilizer additive, respectively, depends on the determined position on the field.

The vehicle's position can be determined, e.g. using a satellite navigation system, like the GPS system, or a similar system to locate the vehicle on a geographical grid. This allows relating the position on the field to a position on a digital map. However, the position of the vehicle can also be measured relatively to a reference point on the field, for example by tracking the vehicle's direction and speed, starting at the reference point. In this embodiment, the quantity of the solid fertilizer and the liquid fertilizer additive can be advantageously optimized for the conditions in different places on the field.

According to an embodiment of the invention, the solid fertilizer is in granulated or prill form. This is a common form for solid fertilizer and allows using different types of granules as described below, e.g. fertilizers with specific release patterns.

According to an embodiment of the invention, the solid fertilizer is a solid nitrogen-containing fertilizer. The method according to the invention has the advantage that the solid nitrogen-containing fertilizer and the liquid fertilizer additive may be applied from two separate reservoirs and are not mixed before spreading the fertilizer on the soil and, at the same time, reduce nitrogen losses, e. g. as ammonia losses. Furthermore, the ratio of used solid fertilizer and liquid fertilizer additive can be adjusted to the user's needs as described above. Like this, the combination can be optimized for the treated soil.

The term "fertilizers" is to be understood as chemical compounds applied to promote plant and fruit growth. Fertilizers are typically applied either through the soil or soil substituents for uptake by plant roots. The term also includes mixtures of one or more different types of fertilizers as mentioned below. The term "fertilizers" can be subdivided into several categories including: a) organic fertilizers (composed of decayed plant/animal matter), b) inorganic fertilizers (composed of chemicals and minerals) and c) urea-containing fertilizers.

According to the invention at least the following the solid fertilizers or combinations thereof may be used:

Organic fertilizers include manure, e.g. liquid manure, semi-liquid manure, liquid dung-water, biogas manure, stable manure or straw manure, slurry, sewage sludge, worm castings, peat, seaweed, compost, sewage, and guano. Green manure crops are also regularly grown to add nutrients (especially nitrogen) to the soil. Manufactured organic fertilizers include compost, blood meal, bone meal and seaweed extracts. Further examples are enzyme digested proteins, fish meal, and feather meal. The decomposing crop residue from prior years is another source of fertility.

Inorganic fertilizers are usually manufactured through chemical processes (such as the Haber-Bosch process), also using naturally occurring deposits, while chemically altering them (e.g. concentrated triple superphosphate). Naturally occurring inorganic fertilizers include Chilean sodium nitrate, mine rock phosphate, limestone, and raw potash fertilizers.

Typical solid fertilizers are in a kristallin, prilled or granulated form. Typical nitrogen containing inorganic fertilizers are ammonium nitrate, calcium ammonium nitrate, ammonium sulfate, ammonium sulfate nitrate, calcium nitrate, diammonium phosphate, monoammonium phosphate, ammonium thio sulfate and calcium cyanamide.

The inorganic fertilizer may be an NPK fertilizer. "NPK fertilizers" are inorganic fertilizers formulated in appropriate concentrations and combinations comprising the three main nutrients nitrogen (N), phosphorus (P) and potassium (K) as well as typically S, Mg, Ca, and trace elements. "NK fertilizers" comprise the two main nutrients nitrogen (N) and potassium (K) as well as typically S, Mg, Ca, and trace elements. "NP fertilizers" comprise the two main nutrients nitrogen (N) and phosphorus (P) as well as typically S, Mg, Ca, and trace elements. NPK, NK and NP fertilizers can be produced chemically or by a mixture of its single components.

Urea-containing fertilizer may be urea, formaldehyde urea, urea sulfur, urea based NPK-fertilizers, or urea ammonium sulfate. Also envisaged is the use of urea as fertilizer. In case urea-containing fertilizers or urea are used or provided, it is particularly preferred that urease inhibitors as below may be added or additionally be present, or be used at the same time or in connection with the urea-containing fertilizers.

In further embodiments the fertilizer mixture may be provided as, or may comprise or contain a slow release fertilizer. The fertilizer may, for example, be released over any suitable period of time, e.g. over a period of 1 to 5 months, preferably up to 3 months. Typical examples of ingredients of slow release fertilizers are IBDU (isobutylidenediurea), e.g. containing about 31-32% nitrogen, of which 90% is water insoluble; or UF, i.e. an urea-formaldehyde product which contains about 38% nitrogen of which about 70% may be provided as water insoluble nitrogen; or CDU (crotonylidene diurea) containing about 32% nitrogen; or MU (methylene urea) containing about 38 to 40% nitrogen, of which 25-60% is typically cold water insoluble nitrogen; or MDU (methylene diurea) containing about 40% nitrogen, of which less than 25% is cold water insoluble nitrogen; or DMTU (dimethylene triurea) containing about 40% nitrogen, of which less than 25% is cold water insoluble nitrogen; or TMTU (tri methylene tetraurea), which may be provided as component of UF products; or TMPU (tri methylene pentaurea), which may also be provided as component of UF products.

The fertilizer mixture may also be long-term nitrogen-bearing fertiliser containing a mixture of acetylene diurea and at least one other organic nitrogen-bearing fertiliser selected from methylene urea, isobutylidene diurea, crotonylidene diurea, substituted triazones, triuret or mixtures thereof.

Any of the above mentioned fertilizers or fertilizer forms may suitably be combined.

In the terms of the present invention "mixture" or "agrochemical mixture" means a combination of at least two active compounds, such as several fertilizers or a fertilizer and a fertilizer additive. The terms "mixture" and "agrochemical mixture" are interchangeable. The agrochemical mixture may be co-formulated or formulated separately. If the agrochemical mixture is formulated separately, the fertilizer and the fertilizer additive are applied in a temporal relationship, i.e. simultaneously or subsequently, whereas the subsequent application is carried out within a time interval which allows the combined action of the fertilizer and fertilizer additive on the soil. If the agrochemical mixture is co-formulated at least one fertilizer additive is still applied separately so that the agrochemical mixture and the at least one fertilizer additive are applied in a temporal relationship, i.e. simultaneously or subsequently, whereas the subsequent application is carried out within a time interval which allows the combined action of the agrochemical mixture and fertilizer additive on the soil.

The term "at least one" is to be understood as 1, 2, 3 or more.

The term "soil" is to be understood as a natural body comprised of living (e.g. microorganisms (such as bacteria and fungi), animals and plants) and non-living matter (e.g. minerals and organic matter (e.g. organic compounds in varying degrees of decomposition), liquid, and gases) that occurs on the land surface, and is characterized by soil horizons that are distinguishable from the initial material as a result of various physical, chemical, biological, and anthropogenic processes. From an agricultural point of view, soils are predominantly regarded as the anchor and primary nutrient base for plants (plant habitat).

According to an embodiment of the invention, the liquid fertilizer additive comprises a nitrification inhibitor and/or a urease inhibitor and/or a denitrification inhibitor. This reduces the loss of nitrogen from the soil and increases the efficiency of the used nitrogen-containing fertilizer. For example, the combination of a urea-containing fertilizer as solid fertilizer and an inhibitor in liquid form as described above allows optimizing the amount of used fertilizer and avoiding nitrogen losses.

The term "nitrification inhibitors" is to be understood as any chemical substance which slows down or stops the nitrification process. Nitrification inhibitors retard the natural transformation of ammonium into nitrate, by inhibiting the activity of bacteria such as *Nitrosomonas* spp. and/or Archaea. The term "nitrification" is to be understood as the biological oxidation of ammonia ($NH_3$) or ammonium ($NH_4^+$) with oxygen into nitrite ($NO_2^-$) followed by the oxidation of these nitrites into nitrates ($NO_3^-$) by microorganisms. Besides nitrate ($NO_3^-$) nitrous oxide is also produced though nitrification. Nitrification is an important step in the nitrogen cycle in soil.

The term "denitrification" is to be understood as the microbiological conversion of nitrate ($NO_3^-$) and nitrite ($NO_2^-$) to gaseous forms of nitrogen, generally $N_2$ or $N_2O$. This respiratory process reduces oxidized forms of nitrogen in response to the oxidation of an electron donor such as organic matter. The preferred nitrogen electron acceptors in order of most to least thermodynamically favorable include: nitrate ($NO_3^-$), nitrite ($NO_2^-$), nitric oxide (NO), and nitrous oxide ($N_2O$). Within the general nitrogen cycle, denitrification completes the cycle by returning $N_2$ to the atmosphere. The process is performed primarily by heterotrophic bacteria (such as *Paracoccus denitrificans* and various pseudomonads), although autotrophic denitrifiers have also been identified (e.g. *Thiobacillus denitrificans*). Denitrifiers are represented in all main phylogenetic groups. When faced with a shortage of oxygen many bacterial species, are able switch from using oxygen to using nitrates to support respiration in a process known as denitrification, during which the water-soluble nitrates are converted to gaseous products, including nitrous oxide, that are emitted into the atmosphere.

"Nitrous oxide", commonly known as happy gas or laughing gas, is a chemical compound with the chemical formula $N_2O$. At room temperature, it is a colorless non-flammable gas. Nitrous oxide is produced naturally in soils through the microbial processes of nitrification and denitrification. These natural emissions of nitrous oxide can be increased by a variety of agricultural practices and activities including for example a) direct addition of nitrogen to soils by using mineral and organic fertilizers, b) growing of nitrogen-fixing crops, c) cultivation of high organic content soils.

Examples of envisaged alternative or additional nitrification inhibitors are linoleic acid, alpha-linolenic acid, methyl p-coumarate, methyl ferulate, methyl 3-(4-hydroxyphenyl) propionate (MHPP), Karanjin, brachialacton, p-benzoquinone sorgoleone, 2-chloro-6-(trichloromethyl)-pyridine (nitrapyrin or N-serve), dicyandiamide (DCD, DIDIN), 3,4-dimethyl pyrazole (DMP), 3,4-dimethyl pyrazole derivatives, 3,4-dimethyl pyrazole phosphate (DMPP, ENTEC), 4-amino-1,2,4-triazole hydrochloride (ATC), 1-amido-2-thiourea (ASU), 2-amino-4-chloro-6-methylpyrimidine (AM), 2-mercapto-benzothiazole (MBT), 5-ethoxy-3-trichloromethyl-1,2,4-thiodiazole (terrazole, etridiazole), 2-sulfanilamidothiazole (ST), ammoniumthiosulfate (ATU), 3-methylpyrazol (3-MP), 3,5-dimethylpyrazole (DMP), 1,2,4-triazol thiourea (TU), N-(1H-pyrazolylmethyl)acetamides such as N-((3(5)-methyl-1H-pyrazole-1-yl)methyl)acetamide, and N-(1H-pyrazolyl-methyl)formamides such as N-((3(5)-methyl-1H-pyrazole-1-yl) methyl formamide, N-(4-chloro-3(5)-methyl-pyrazole-1-ylmethyl)-formamide, N-(3(5),4-dimethyl-pyrazole-1-ylmethyl)-formamide, mixtures of 3,4-di methyl pyrazole phospate succinic acid and 4,5-dimethylpyrazole phosphate succinic acid, neem, products based on ingredients of neem, cyan amide, melamine, zeolite powder, catechol, benzoquinone, sodium tetra borate, zinc sulfate.

The liquid fertilizer additive can comprise at least one nitrification inhibitor selected from the group consisting of 2-(3,4-dimethyl-pyrazol-1-yl)-succinic acid, 3,4-dimethyl pyrazole (DMP), 3,4-dimethyl pyrazole derivatives, 3,4-di methyl pyrazolephosphate (DMPP), dicyandiamide (DCD), 1H-1,2,4-triazole, 3-methylpyrazole (3-MP), 2-chloro-6-(trichloromethyl)-pyridine, 5-ethoxy-3-trichloromethyl-1,2,4-thiadiazol, 2-amino-4-chloro-6-methyl-pyrimidine, 2-mercapto-benzothiazole, 2-sulfanilamidothiazole, thiourea, sodium azide, potassium azide, 1-hydroxypyrazole, 2-methylpyrazole-1-carboxamide, 4-amino-1,2,4-triazole, 3-mercapto-1,2,4-triazole, 2,4-diamino-6-trichloromethyl-5-triazine, carbon bisulfide, ammonium thiosulfate, sodium trithiocarbonate, 2,3-dihydro-2,2-dimethyl-7-benzofuranol methyl carbamate and N-(2,6-dimethylphenyl)-N-(methoxyacetyl)-alanine methyl ester.

Fertilizers which are suitable to combine the above-mentioned nitrification inhibitors are urea and/or ammonium-containing N-organic and inorganic fertilizers, as described above.

Examples of envisaged urease inhibitors include N-(n-butyl) thiophosphoric acid triamide (NBPT, Agrotain), N-(n-propyl) thiophosphoric acid triamide (NPPT), 2-nitrophenyl phosphoric triamide (2-NPT), further NXPTs known to the skilled person, phenylphosphorodiamidate (PPD/PPDA), hydroquinone, ammonium thiosulfate, and mixtures of NBPT and NPPT (see e.g. U.S. Pat. No. 8,075,659). Such mixtures of NBPT and NPPT may comprise NBPT in amounts of from 40 to 95% wt.-% and preferably of 60 to 80% wt.-% based on the total amount of active substances. Such mixtures are marketed as LIMUS, which is a composition comprising about 16.9 wt.-% NBPT and about 5.6 wt.-% NPPT and about 77.5 wt.-% of other ingredients including solvents and adjuvants. Furthermore, urease inhibitors can be neem and products based on ingredients of neem. Particularly preferably, the composition comprises NBPT and NPPT, wherein NBPT is present in amounts of from 1 to 99.99 wt. %, more preferably from 10 to 99.9 wt. %, most preferably from 20 to 99 wt. %, particularly preferably from 30 to 98 wt. %, more particularly preferably from 40 to 95 wt. %, most particularly preferably from 50 to 90 wt. %, especially from 60 to 85 wt. %, especially preferably from 72 to 80 wt. %, for example from 74 to 77 wt. %, in each case based on the total weight of the (thio)phosphoric acid triamides contained in the composition.

Fertilizers which are suitable to combine them with urease inhibitors are urea-containing fertilizers, as described above.

Examples of denitrification inhibitors are strobilurin components selected from the group consisting of pyraclostrobin, azoxystrobin, dimoxystrobin, enestroburin, flu-oxastrobin, kresoxim-methyl, metominostrobin, orysastrobin, picoxystrobin, trifloxystrobin, pyrametostrobin, pyraoxystrobin, coumoxystrobin, coumethoxystrobin, fenaminostrobin (=diclofenoxystrobin), flufenoxystrobin, 2-(2-(6-(3-chloro-2-methyl-phenoxy)-5-fluoropyrimidin-4-yloxy)-phenyl)-2-methoxyimino-N-methylacetamide, 3-methoxy-2-(2-(N-(4-methoxy-phenyl)-cyclopropane-carboximidoylsulfanylmethyl)-phenyl)-acrylic acid methyl ester, methyl (2-chloro-5-[1-(3-methylbenzyloxyimino)ethyl]benzyl)carbamate and 2-(2-(3-(2,6-dichlorophenyl)-1-methyl-allylideneaminooxymethyl)-phenyl)-2-methoxyimino-N methyl-acetamide.

Fertilizers which are suitable to combine them with denitrification inhibitors are all N-containing fertilizers, as described above.

According to a further embodiment of the invention, electromagnetic radiation emitted from plants on the working area of the field is detected. Said detected electromagnetic radiation is analyzed to obtain a nitrogen status value for each segment of the field. The ratio of liquid fertilizer additive to solid fertilizer is calculated for each segment of the field as a function of the obtained nitrogen status value for the respective segment.

The calculated ratio of liquid fertilizer additive to solid fertilizer is then applied to each segment of the field.

According to this embodiment, the ratio of liquid fertilizer additive to solid fertilizer may be calculated while the vehicle moves on the field. Therefore, an in-field non-invasive method may be provided.

According to an embodiment, the electromagnetic radiation that is detected is reflected by the plants on the field. For example, electromagnetic radiation provided by sunlight or ambient light is reflected by the plants. This reflected radiation is then detected. The direct light intensity of the sunlight or ambient light may be detected additionally in order to take changes during operation into account. Furthermore, electromagnetic radiation may be emitted by a light source that may be mounted on the vehicle. The emission of this light source is reflected by the plants and then detected.

The nitrogen status value may then be obtained by analyzing particular spectra of the detected electromagnetic radiation. In particular, two wavelengths are used for the analysis, one in the visible spectrum of the detected electromagnetic radiation, in particular a wavelength that relates to the plant chlorophyll content, and one in the invisible near-infrared spectrum that relates to biomass. After an initial calibration procedure, analyzing the intensity of these wavelengths makes it possible to calculate the amount of nitrogen taken up by the plants that emitted the detected electromagnetic radiation. From this data, a nitrogen status value for a particular segment of the field may be obtained. The nitrogen status value may then not only be used for calculating the amount of fertilizer that should be applied to this segment but also to calculate the ratio of liquid fertilizer additive to solid fertilizer that should be applied. Therefore, a real-time method is provided for obtaining a required amount of fertilizer and fertilizer additive to be applied and, consequently, for applying these amounts to the field.

The vehicle according to the first aspect of the invention comprises a solid fertilizer spreading device, mounted on the vehicle, for spreading a solid fertilizer on the working area and a field sprayer, which is mounted on the vehicle separately from the solid fertilizer spreading device, for spraying a liquid fertilizer additive on the working area. Thereby, the field sprayer is arranged relatively to the solid fertilizer spreading device so that the liquid fertilizer additive is prevented from coming into contact with surfaces of the solid fertilizer spreading device, which also come into contact with the solid fertilizer.

The vehicle according to the invention is configured to execute the method according to the invention and therefore has the same advantages. Specifically, the solid fertilizer spreading device and the field sprayer are configured so that the liquid fertilizer additive does not reach the parts of the solid fertilizer spreading device, where the solid fertilizer is ejected. Thus, the formation of clumps or sticking of the solid fertilizer to the spreading device is advantageously avoided.

In particular the vehicle according to the invention may be used for spreading a solid nitrogen-containing fertilizer and a liquid fertilizer additive as described above.

In an embodiment of the invention, the solid fertilizer spreading device comprises at least one ejection device with an ejection opening and the field sprayer is arranged on the vehicle in a distance from the ejection opening and a direction relative to the ejection opening so that the liquid fertilizer additive, when sprayed, does not reach the ejection opening.

The ejection device of the solid fertilizer spreading device is specifically the part where the solid fertilizer leaves the device and is ejected onto the field. The specific structure depends on the type of spreader that is used.

In an embodiment, the solid fertilizer spreading device comprises a centrifugal spreader. This is one of the common types of fertilizer spreader. It is suited to apply solid fertilizer, e.g., in form of granules, to a large area around the vehicle.

According to the invention, the centrifugal spreader can comprise at least one rotating disk and the field sprayer can be arranged on the vehicle in a distance from the rotating disk and a direction relative to the rotating disk so that the liquid fertilizer additive, when sprayed, does not reach the rotating disk.

In the case of a centrifugal spreader, the ejection device comprises typically a rotating disk, from which the solid fertilizer is ejected by centrifugal forces. The characteristics of this mechanism depend on the friction between the fertilizer material, e.g., the granules, and the material of the disk. If the disk gets wet from the liquid fertilizer additive, the fertilizer might not be ejected in a radius as wide as on the dry disk or the fertilizer might get distributed unevenly over the field. Therefore, the rotating disk needs to be kept dry and protected from the liquid fertilizer additive.

Alternatively, the solid fertilizer spreading device can comprise a pneumatic spreader. This is another common type of fertilizer spreader, which allows a very controlled distribution of solid fertilizer on the field.

In a further embodiment, the pneumatic spreader comprises at least one deflection plate and the field sprayer is arranged on the vehicle in a distance from the deflection plate and a direction relative to the deflection plate so that the liquid fertilizer additive, when sprayed, does not reach the deflection plate.

Typically, pneumatic spreaders function by ejecting the fertilizer onto a plate in the stream of fertilizer, from where it is then deflected and spread over a defined angle. According to the invention, the plate is protected from getting into contact with the liquid fertilizer additive. A wet surface might change the deflection behavior and result in an uncontrolled or uneven distribution of fertilizer on the field.

In one embodiment of the invention, the solid fertilizer spreading device is arranged at the rear of the vehicle in the direction of travel and the field sprayer is arranged at the front of the vehicle in the direction of travel. Alternatively, the solid fertilizer spreading device may be arranged at the front of the vehicle in the direction of travel and the field sprayer is arranged at the rear of the vehicle in the direction of travel. Furthermore, the solid fertilizer spreading device and the field sprayer may be arranged at the rear of the vehicle in the direction of travel or the solid fertilizer spreading device and the field sprayer may be arranged at the front of the vehicle. However, the arrangement is such that the liquid fertilizer additive is prevented from coming into contact with surfaces of the solid fertilizer spreading device, which also come into contact with the solid fertilizer.

In particular, the nozzles of the field sprayer can be oriented so that the liquid fertilizer additive does not come into contact with critical parts of the solid fertilizer spreading device.

According to the invention, the vehicle can comprise a trailer. The term "vehicle" is understood as a means of transport, on which the solid fertilizer spreader device and the field sprayer can be mounted and moved over the field. Especially, it can comprise a tractor and one or more trailers. Both the solid fertilizer spreading device and the field sprayer can be mounted on any of the parts of the vehicle and/or the trailer, as long as the configuration makes sure that the liquid fertilizer additive is prevented from coming into contact with surfaces of the solid fertilizer spreading device, which also come into contact with the solid fertilizer. Advantageously, the distance between the solid fertilizer spreading device and the field sprayer can be enlarged to protect the solid fertilizer spreading device from the liquid fertilizer additive, if a trailer is used.

The vehicle can also move automatically, for example using an automatic controller that steers the vehicle along a predefined route over the field.

In another embodiment, the vehicle comprises a sensor to measure the vehicle's speed. Furthermore, it comprises a control unit that controls the rates of spreading the solid fertilizer, in particular the solid nitrogen-containing fertilizer, and spraying the liquid fertilizer additive on the working area as a function of the vehicle's speed and a longitudinal distance between the solid fertilizer spreading device, in particular an ejection opening of the solid fertilizer spreading device, and the field sprayer, in particular a nozzle or nozzles of the field sprayer, so that a predetermined quantity of solid fertilizer and liquid fertilizer additive, respectively, is applied to each segment of the field.

The solid fertilizer and the liquid fertilizer additive are typically applied continuously to the field. To control the quantity of material that is deposited on the field, the rates of spreading and spraying can be adjusted. The rate that is necessary to reach a determined deposition of the solid fertilizer and the liquid fertilizer additive on the field depends on the velocity of the vehicle relatively to the field. In addition to that, the separation of the solid fertilizer spreading device and the field sprayer might lead to a situation, where both devices apply material to different segments of the field at the same time. For example, the field sprayer can be arranged 10 m in front of the solid fertilizer spreading device. Depending on the specific configuration, the solid fertilizer spreading device might need to move 10 m further to apply the solid fertilizer to the same area where the liquid fertilizer additive was sprayed before. In order to reach a predetermined ratio of both compounds, the rates need to be coordinated with respect to time so that the correct ratio is reached on each segment of the field.

In one embodiment, the vehicle comprises alternatively or in addition geographical locating means coupled to the control unit. Said control unit is adapted to control the rates of spreading the solid fertilizer and spraying the liquid fertilizer additive on the working area as a function of the vehicle's geographical position.

This allows using information about the properties of the soil in specific locations on the field to separately optimize the quantities of solid fertilizer and liquid fertilizer additive. For example, if less nitrogen should be applied to a segment of the field, the rates can be adjusted accordingly. This information can be stored in a digital map, which is then used to control the fertilization process on the field.

According to a further embodiment of the invention, the vehicle further comprises an optical sensor for detecting electromagnetic radiation emitted from plants on the working area of the field, an analyzing unit for obtaining a nitrogen status value for each segment of the field based on said detected electromagnetic radiation, a calculating unit for calculating the ratio of liquid fertilizer additive to solid fertilizer for each segment of the field as function of the obtained nitrogen status value for the respective segment, and a control unit that controls the application of the calculated ratio of liquid fertilizer additive to solid fertilizer to each segment of the field.

According to an embodiment of the invention, the optical sensor is mounted on the vehicle. The position of the optical sensor is such that electromagnetic radiation is detected that is emitted from plants that are located in front of the current working area to which the fertilizer and the fertilizer additive are to be applied. Therefore, the ratio of liquid fertilizer additive to solid fertilizer may be applied to each segment based on the nitrogen status value that has been calculated immediately before the application of the liquid fertilizer additive and the solid fertilizer.

According to an embodiment, the optical sensor detects electromagnetic radiation in the visible spectrum as well as in the near-infrared spectrum. In particular, the intensity of at least one wavelength in each of these spectra is detected, preferably the intensities of two or more wavelengths in each spectrum is detected.

According to another embodiment, the optical sensor is a digital camera, such as a CCD camera taking images of segments of the field. The analyzing unit then comprises an image-processing unit that can analyze the nitrogen status of the plants shown in the image.

According to a further embodiment, the optical sensor is space-mounted, for example, on a satellite. The satellite images are transferred to the analyzing unit that may be mounted on the vehicle or elsewhere. Data from the analyzing unit are then transferred to the control unit that controls the application of the liquid fertilizer additive and the solid fertilizer.

According to a second aspect of the present invention the method comprises spreading a fertilizer on the working area using a fertilizer spreading device mounted on the vehicle and spreading a fertilizer additive on the working area using a field spreader, mounted on the vehicle separately from the fertilizer spreading device, determining the vehicle's geographical position and applying a predetermined quantity of fertilizer and fertilizer additive, respectively, to the field depending on the determined position on the field.

The method of the present invention allows particularly solving the following challenge in using a mixture of fertilizer and fertilizer additive: The life times of fertilizers and fertilizer additives, e.g. nitrification inhibitors, denitrification inhibitors or urease inhibitors, can be very different. For example, inhibitors may have a limited shelf live as compared to common nitrogen-containing fertilizers. Therefore, combining both components in one formulation, e.g. by integrating the inhibitor compound into a granulate form of the fertilizer, leads to a time-dependent change in the ratio of active inhibitor compound and fertilizer content.

According to method of the second aspect of the present invention, it is now possible to change the concentrations and the ratio of fertilizer and fertilizer additive by the user, in contrast to having them combined in one product. This is desirable to allow the user optimizing the fertilization process, e.g. to specific conditions like soil quality, humidity, temperature and other climatic conditions.

The vehicle's position can be determined, e.g. using a satellite navigation system, like the GPS system, or a similar system to locate the vehicle on a geographical grid. This allows relating the position on the field to a position on a digital map. However, the position of the vehicle can also be measured relatively to a reference point on the field, for example by tracking the vehicle's direction and speed, starting at the reference point. In this embodiment, the quantity of the fertilizer and the fertilizer additive can be advantageously optimized for the conditions in different places on the field.

According to further embodiment, the vehicle's speed is measured and the rates of spreading the fertilizer and the fertilizer additive on the working area are controlled as a function of the vehicle's speed and a longitudinal distance between the fertilizer spreading device and the field spreader so that a predetermined quantity of fertilizer and fertilizer additive, respectively, is applied to each segment of the field.

Moreover, the rates of spreading the fertilizer and the fertilizer additive on the working area may be controlled as a function of the vehicle's speed and a longitudinal distance between an ejection opening or ejection openings of the fertilizer spreading device and another ejection opening or nozzle of the field spreader. This is done so that a predetermined quantity of fertilizer and fertilizer additive, respectively, is applied to each segment of the field.

This allows advantageously adjusting the quantity of both the fertilizer and the fertilizer additive that is deposited on each segment of the field so that also the ratio of both components may be controlled. Thereby, the working area of the field is the area on which the fertilizer should be applied. This working area is divided into "segments", which represent the smallest unit area that can be treated specifically with the solid fertilizer spreading device and the field spreader. The size of the segments depends on the geometry of the distribution that is generated by the fertilizer spreading device and the field spreader. For example, the working width, in which the fertilizer and the fertilizer additive are distributed, may vary depending on their specific configuration.

The rate at which both compounds are applied to the field is coordinated to reach a predetermined ratio. It should be noted that the fertilizer and the fertilizer additive are not necessarily applied to exactly the identical segment of the field at exactly the same time. For example, the solid fertilizer spreading device may be mounted at the rear of the vehicle, while the field sprayer is mounted on the front. Therefore, a specific segment of the field may first come into contact with the fertilizer additive and subsequently with the fertilizer or the other way round.

According to a further embodiment of the invention, electromagnetic radiation emitted from plants on the working area of the field is detected. Said detected electromagnetic radiation is analyzed to obtain a nitrogen status value for each segment of the field. The ratio of fertilizer additive to fertilizer is calculated for each segment of the field as a function of the obtained nitrogen status value for the respective segment. The calculated ratio of fertilizer additive to fertilizer is then applied to each segment of the field.

According to this embodiment, the ratio of fertilizer additive to fertilizer may be calculated while the vehicle moves on the field. Therefore, an in-field non-invasive method may be provided.

According to an embodiment, the electromagnetic radiation that is detected is reflected by the plants on the field as described above. Moreover, the nitrogen status value may then be obtained as described above. The nitrogen status value may then not only be used for calculating the amount of fertilizer that should be applied to a particular segment but also to calculate the ratio of fertilizer additive to fertilizer that should be applied. Therefore, a real-time method is provided for obtaining a required amount of fertilizer and fertilizer additive to be applied and, consequently, for applying these amounts to the field.

The fertilizer may be a solid fertilizer and the fertilizer additive may be a liquid fertilizer additive. In this case the field spreader is a field sprayer for spraying the liquid fertilizer additive. In this case, according to the invention, and the liquid fertilizer additive is prevented from coming into contact with surfaces of the fertilizer spreading device, which also come into contact with the solid fertilizer.

As described with respect to the first aspect of the invention in this case the configuration of the field sprayer and the fertilizer spreading device avoids liquid fertilizer additive being blown towards the solid fertilizer spreading device. Wetting of the solid fertilizer component with the liquid fertilizer additive is prevented as the fertilizer spreading device and the field sprayer are mounted on the vehicle separately from each other so that the liquid fertilizer additive is prevented from coming into contact with surfaces of the solid fertilizer spreading device, which also come into contact with the solid fertilizer. In particular, the formation of clumps and material sticking to the fertilizer spreading device is thereby prevented.

Therefore, both the solid fertilizer spreading device and the field sprayer can be mounted on any of the parts of the vehicle and/or the trailer, as long as the configuration makes sure that the liquid fertilizer additive is prevented from coming into contact with surfaces of the solid fertilizer spreading device, which also come into contact with the solid fertilizer. Advantageously, the distance between the solid fertilizer spreading device and the field sprayer can be enlarged to protect the solid fertilizer spreading device from the liquid fertilizer additive, if a trailer is used.

According to an embodiment, the solid fertilizer is a solid nitrogen-containing fertilizer. The method according to the invention has the advantage that the solid nitrogen-containing fertilizer and the liquid fertilizer additive are applied from two separate reservoirs and are not mixed before spreading the fertilizer on the soil and, at the same time, reduce nitrogen, e. g. as ammonia losses. Furthermore, the ratio of used solid fertilizer and liquid fertilizer additive can be adjusted to the user's needs. Like this, the combination can be optimized for the treated soil.

The method of the second aspect the invention allows using information about the properties of the soil in specific locations on the field to separately optimize the quantities of solid fertilizer and liquid fertilizer additive. For example, if less nitrogen should be applied to a segment of the field, the rates can be adjusted accordingly. This information can be stored in a digital map, which is then used to control the fertilization process on the field.

According to the second aspect of the invention solid fertilizers or combinations thereof may be used as described above. In addition, in accordance with the second aspect of the invention the fertilizers may also be liquid.

Therefore, the fertilizer may also be one of the following or combinations thereof:

An urea-containing fertilizer may also be anhydrous ammonium or urea ammonium nitrate (UAN) solution. A slow release fertilizer be also be MO (methylol urea) containing about 30% nitrogen, which may typically be used in solutions, or UT (urea triazone solution) which typically contains about 28% nitrogen.

Any of the above mentioned fertilizers or fertilizer forms may suitably be combined.

The solid fertilizer may be in granulated or prill form as described above.

According to an embodiment of the second aspect of the invention, the fertilizer additive comprises a nitrification inhibitor and/or a urease inhibitor and/or a denitrification inhibitor as described above with respect to the first aspect of the invention.

The vehicle according to the second aspect of the invention comprises a fertilizer spreading device, mounted on the vehicle, for spreading a fertilizer on the working area, a field spreader, which is mounted on the vehicle separately from the fertilizer spreading device, for spreading a fertilizer additive on the working area, a control unit that controls the rates of spreading the fertilizer and the fertilizer additive on the working area and geographical locating means coupled to the control unit, said control unit being adapted to control the rates of spreading the fertilizer and the fertilizer additive on the working area as a function of the vehicle's geographical position.

The vehicle according to the invention is configured to execute the method according to the invention and therefore has the same advantages.

The fertilizer and the fertilizer additive, in particular a liquid fertilizer additive, are typically applied continuously to the field. To control the quantity of material that is deposited on the field, the rates of spreading can be adjusted. The rate that is necessary to reach a determined deposition of the fertilizer and the fertilizer additive on the field depends on the velocity of the vehicle relatively to the field. In addition to that, the separation of the fertilizer spreading device and the field spreader might lead to a situation, where both devices apply material to different segments of the field at the same time. For example, the field spreader can be arranged 10 m in front of the fertilizer spreading device. Depending on the specific configuration, the fertilizer spreading device might need to move 10 m further to apply the fertilizer to the same area where the fertilizer additive was spread before. In order to reach a predetermined ratio of both compounds, the rates need to be coordinated with respect to time so that the correct ratio is reached on each segment of the field.

Specifically, the fertilizer spreading device is adapted for spreading a solid fertilizer on the working area and the field spreader is a field sprayer for spraying a liquid fertilizer additive on the working area as described above with respect to the first aspect of the invention. Moreover, the vehicle according to the invention may be used for spreading a solid nitrogen-containing fertilizer as described above.

Accordingly, the fertilizer spreading device and the field sprayer are configured so that the liquid fertilizer additive does not reach the parts of the fertilizer spreading device, where the solid fertilizer is ejected. Thus, the formation of clumps or sticking of the solid fertilizer to the spreading device is advantageously avoided.

In general, according to the second aspect of the invention, the fertilizer may be solid and/or liquid and the fertilizer additive may be solid and/or liquid.

In an embodiment, the vehicle comprises a sensor to measure the vehicle's speed.

Furthermore, the control unit controls the rates of spreading the fertilizer and the fertilizer additive on the working area as a function of the vehicle's speed and a longitudinal distance between an ejection opening of the fertilizer spreading device and an ejection opening of the field spreader that may be a nozzle if the fertilizer additive is liquid. Thereby a predetermined quantity of fertilizer and fertilizer additive, respectively, is applied to each segment of the field.

The ejection device of the solid fertilizer spreading device is specifically the part where the solid fertilizer leaves the device and is ejected onto the field. The specific structure depends on the type of spreader that is used.

In an embodiment, the solid fertilizer spreading device comprises a centrifugal spreader. This is one of the common types of fertilizer spreader. It is suited to apply solid fertilizer, e.g., in form of granules, to a large area around the vehicle.

According to the invention, the centrifugal spreader can comprise at least one rotating disk and the field sprayer can be arranged on the vehicle in a distance from the rotating disk and a direction relative to the rotating disk so that the liquid fertilizer additive, when sprayed, does not reach the rotating disk.

In the case of a centrifugal spreader, the ejection device comprises typically a rotating disk, from which the solid fertilizer is ejected by centrifugal forces. The characteristics of this mechanism depend on the friction between the fertilizer material, e.g., the granules, and the material of the disk. If the disk gets wet from the liquid fertilizer additive, the fertilizer might not be ejected in a radius as wide as on the dry disk or the fertilizer might get distributed unevenly over the field. Therefore, the rotating disk needs to be kept dry and protected from the liquid fertilizer additive.

Alternatively, the solid fertilizer spreading device can comprise a pneumatic spreader. This is another common type of fertilizer spreader, which allows a very controlled distribution of solid fertilizer on the field.

In a further embodiment, the pneumatic spreader comprises at least one deflection plate and the field sprayer is arranged on the vehicle in a distance from the deflection plate and a direction relative to the deflection plate so that fertilizer additive, in particular the liquid fertilizer additive, when sprayed, does not reach the deflection plate.

Typically, pneumatic spreaders function by ejecting the fertilizer onto a plate in the stream of fertilizer, from where it is then deflected and spread over a defined angle. According to the invention, the plate is protected from getting into contact with the liquid fertilizer additive. A wet surface might change the deflection behavior and result in an uncontrolled or uneven distribution of fertilizer on the field.

In one embodiment of the invention, the solid fertilizer spreading device is arranged at the rear of the vehicle in the direction of travel and the field sprayer is arranged at the front of the vehicle in the direction of travel. Alternatively, the solid fertilizer spreading device may be arranged at the front of the vehicle in the direction of travel and the field sprayer is arranged at the rear of the vehicle in the direction of travel. Furthermore, the solid fertilizer spreading device and the field sprayer are arranged at the rear of the vehicle in the direction of travel or the solid fertilizer spreading device and the field sprayer are arranged at the front of the vehicle. However, the arrangement is such that the liquid fertilizer additive is prevented from coming into contact with surfaces of the solid fertilizer spreading device, which also come into contact with the solid fertilizer.

In particular, the nozzles of the field sprayer can be oriented so that the liquid fertilizer additive does not come into contact with critical parts of the solid fertilizer spreading device.

According to a further embodiment, the vehicle further comprises an optical sensor for detecting electromagnetic radiation emitted from plants on the working area of the field, an analyzing unit for obtaining a nitrogen status value for each segment of the field based on said detected electromagnetic radiation, a calculating unit for calculating the ratio of fertilizer additive to fertilizer for each segment of the field as function of the obtained nitrogen status value for the respective segment, and a control unit that controls the application of the calculated ratio of fertilizer additive to fertilizer to each segment of the field.

According to an embodiment of the invention, the optical sensor is mounted on the vehicle as described above. Therefore, the ratio of fertilizer additive to fertilizer may be applied to each segment based on the nitrogen status value that has been calculated immediately before the application of the fertilizer additive and the fertilizer.

According to an embodiment, the optical sensor detects electromagnetic radiation in the visible spectrum as well as in the near-infrared spectrum as described above. According to another embodiment, the optical sensor is a digital camera and the analyzing unit comprises an image-processing unit as described above.

Embodiments of the present invention are now described with reference to the drawings.

Figure 2:
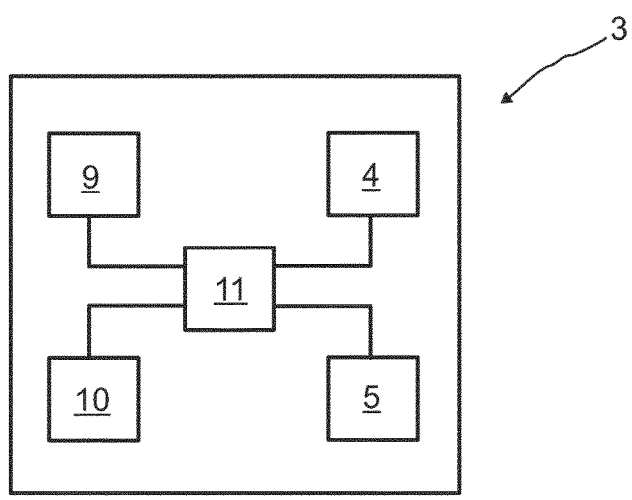
FIG. 2 shows schematically the configuration of a vehicle according to the invention.
Figure 3:
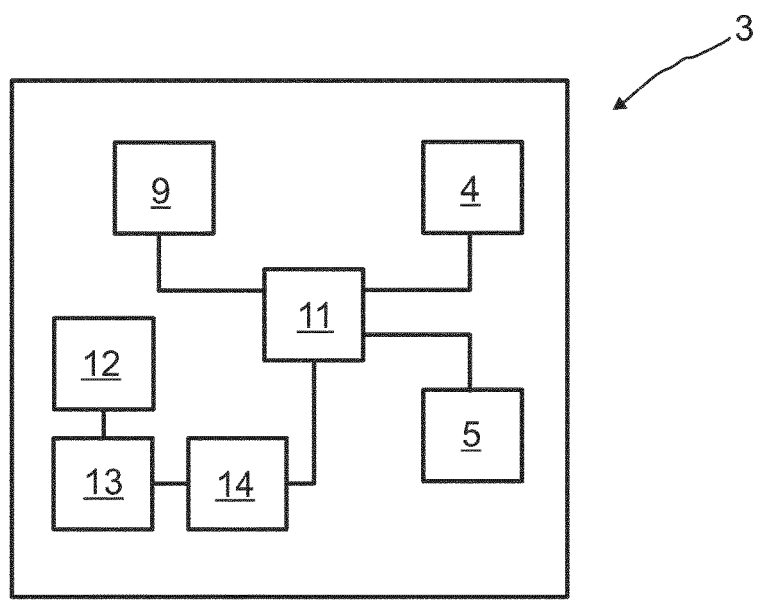
FIG. 3 shows schematically another configuration of a vehicle according to the invention.
Figure 4:
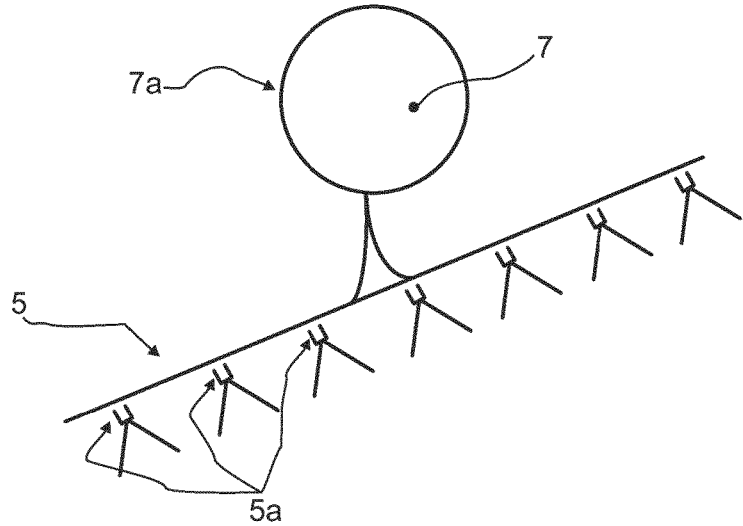
FIG. 4 shows an example of a field sprayer.
Figure 5:
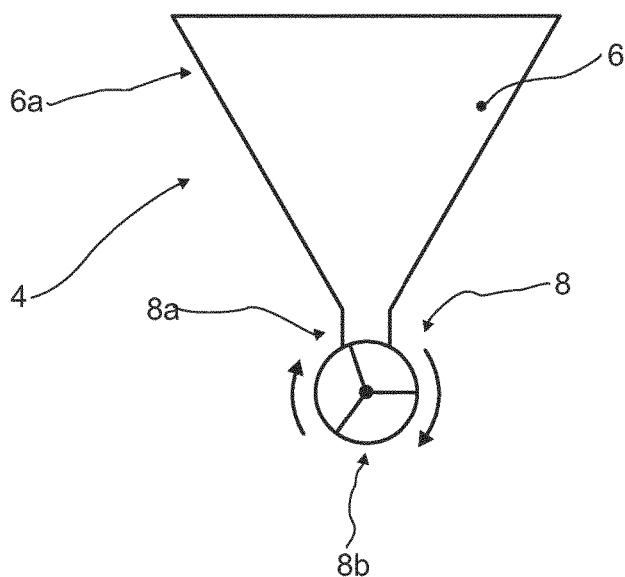
FIG. 5 shows an example of a centrifugal spreader.
Figure 6:
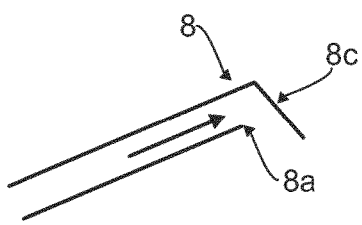
FIG. 6 shows an example of the ejection device of a pneumatic spreader.
Figure 7:
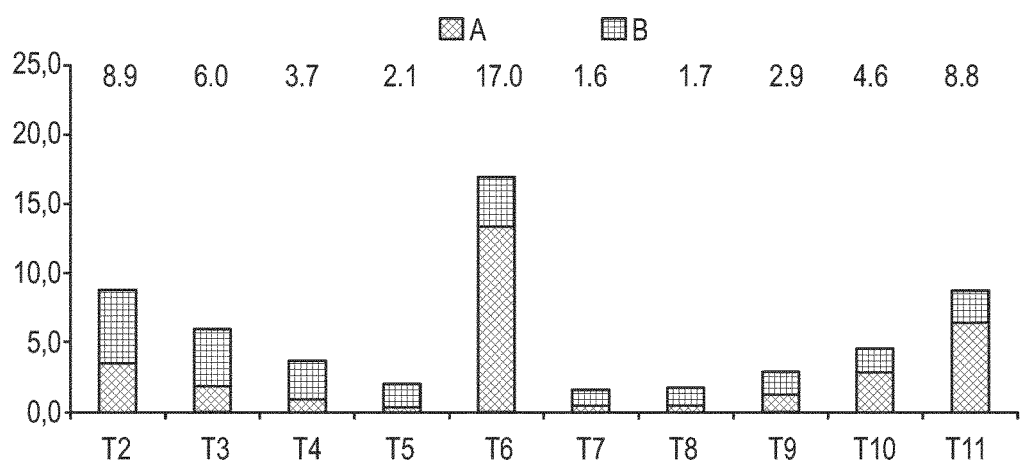
FIG. 7 shows a graph with experimental data.

FIG. 1 shows embodiments of a vehicle according to the present invention,

FIG. 2 shows schematically the configuration of a vehicle according to the invention, FIG. 3 shows schematically another configuration of a vehicle according to the invention, FIG. 4 shows an example of a field sprayer, FIG. 5 shows an example of a centrifugal spreader, FIG. 6 shows an example of the ejection device of a pneumatic spreader, and FIG. 7 shows a graph with experimental data.

With reference to the FIGS. 1 and 2, a first embodiment of a vehicle 3 according to the invention is described.

A vehicle 3 is a tractor that may move on a field 1. However, the vehicle 3 may also comprise a tractor and/or a trailer. Furthermore, it comprises a velocity sensor 9 and geographical locating means 10, which are both coupled to a control unit 11. The control unit 11 controls a fertilizer spreading device 4 for spreading a fertilizer 6, in particular a solid nitrogen-containing fertilizer 6, and a field spreader 5 for spreading a fertilizer additive 7, which are mounted separately on the vehicle 3. The field spreader 5 is a field sprayer 5 if the fertilizer additive 7 is liquid. Especially, the pump or conveying rate of a pump or a conveyer of the field spreader 5 or field sprayer 5 is controlled as well as the speed at which fertilizer 6 is conveyed inside the fertilizer spreading device 4.

Another configuration of the vehicle 3 is shown in FIG. 3. In this case, an optical sensor 12 is mounted on the roof of the vehicle 3. The optical sensor 12 detects electromagnetic radiation that was reflected by the plants on the field 1. In moving direction of the vehicle, the optical sensor 12 is mounted in front of the fertilizer spreading device 4 and the field sprayer 5. Therefore, electromagnetic radiation is detected that has been emitted from plants to which fertilizer 6 as well as fertilizer additive 7 has not yet been applied. The optical sensor 12 detects the intensity of several wavelengths within the visible spectrum and the near-infrared spectrum. The data of the optical sensor 12 are transferred to an analyzing unit 13. The analyzing unit 13 is adapted to obtain a nitrogen status value for each segment of the field 1 based on the detected electromagnetic radiation. The light intensity in the visible spectrum is used to determine a plant chlorophyll content and the light intensity in the invisible near-infrared spectrum is used to detect the biomass. The nitrogen status value obtained by the analyzing unit 13 corresponds to the amount of nitrogen taken up by the plants. The nitrogen status value is then transferred to a calculating unit 14. The calculating unit 14 is adapted to calculate an amount of fertilizer 6 that is to be applied to the plants from which the electromagnetic radiation has been detected as a function of the obtained nitrogen status value. In addition, the calculating unit 14 calculates the ratio of fertilizer additive 7 to fertilizer 6 for the plants whose emission of electromagnetic radiation has been detected as a function of the obtained nitrogen status value. The data calculated by the calculating unit 14 are transferred to the control unit 11 that controls the fertilizer spreading device 4 as well as the field spreader 5 for spreading the fertilizer additive 7. Optionally, the geographic locating means 10 may be provided as described above.

In the following it is assumed, in accordance with a first embodiment, that the fertilizer additive 7 is liquid so that the field spreader 5 is a field sprayer 5 and that the fertilizer 6 is a solid nitrogen-containing fertilizer 6. However, in a second embodiment both the fertilizer additive 7 and the fertilizer 6 are liquid.

The spreading device 4 is mounted on the back of the vehicle 3 in the direction of travel, while the field sprayer 5 is mounted on the front of the vehicle 3. Thus, the distance between the two devices 4 and 5 is chosen as large as possible. In addition to that, the nozzles 5a of the field sprayer 5 are pointing downwards towards the soil, so that the liquid fertilizer additive 7, e. g. as a urease inhibitor, once it is sprayed, does not come into contact with the solid fertilizer spreading device 4, especially not with the parts that come into contact with the solid fertilizer 6 on their part. These parts are especially an ejection device 8 of the spreading device 4, which is described in greater detail further below.

In a further embodiment, the spreading device 4 is mounted at the front of the vehicle 3 in the direction of travel and the field sprayer 5 is mounted on the back of the vehicle 3. If the fertilizer 6 is solid the configuration is chosen to make sure that the liquid fertilizer additive 7 is prevented from coming into contact with surfaces of the solid fertilizer spreading device 4, which also come into contact with the solid fertilizer 6.

With reference to FIG. 4, an example of a field sprayer 5 is described.

The field sprayer 5 is mounted on the vehicle 3 shown in FIGS. 1 and 2. It is coupled to a liquid fertilizer additive reservoir 7a, which stores the liquid fertilizer additive 7. The liquid fertilizer additive 7 is sprayed onto the field 2 from a linear arrangement of nozzles 5a, which can be oriented and configured in a plurality of ways that are known to the expert. Thus, each segment of the working area 2 can be treated with the liquid fertilizer additive 7 in a controlled way. To control the dose of liquid fertilizer additive 7 that is applied to the field 1, the control unit 11 controls the spraying rate based on the geographical position of the vehicle 3 and the velocity v with which the vehicle 3 is moving over the field 1.

With reference to FIG. 5, an example of a spreading device 4 which is a centrifugal spreader 4 is described.

The centrifugal spreader 4 is mounted on the vehicle 3 shown in the FIGS. 1 and 2. FIG. 5 shows the main components of the ejection device 8 of the centrifugal spreader 4. The solid fertilizer 6, such as an urea granulate 6, is stored in a solid fertilizer reservoir 6a.

The centrifugal spreader 4 further comprises an opening 8a, where the urea granulate 6 leaves the solid fertilizer reservoir 6a on a rotating disk 8b, which is used to spread the granulate 6 by centrifugal force.

The rate at which the fertilizer granulate 6, e. g. the urea granulate 6, is spread onto each segment of the working area 2 of the field 1 is controlled by the control unit 11, based on the geographical position of the vehicle 3 and its velocity v on the field 1. The rate is mainly determined by the rate of fertilizer granulate 6, e. g. the urea granulate 6, that is brought to the rotating disk 8b. Furthermore, the size of the area, on which the centrifugal spreader 4 spreads the fertilizer granulate 6, e. g. the urea granulate 6, is determined by properties and the rotating speed of the rotating disk 8b.

Alternatively, the rate at which the fertilizer granulate 6 and liquid fertilizer additive 7 are spread onto each segment of the working area 2 of the field 1 is controlled by the control unit 11 based on the amount of fertilizer 6 as well as the ratio of fertilizer additive 7 to fertilizer 6 as calculated by the calculating unit 14.

To protect the centrifugal spreader 4, in particular the ejection device 8, from getting wet from the liquid fertilizer additive 7, it is oriented in the direction away from the field sprayer 5 to limit the possibility of liquid fertilizer additive 7 from the field sprayer 5 reaching the ejection device 8 of the centrifugal spreader 4.

With reference to FIG. 6, an example of a spreading device 4 which is a pneumatic spreader 4 is described. FIG. 6 shows the ejection device 8 of the pneumatic spreader 4.

The pneumatic spreader 4 is mounted on the vehicle 3 shown in the FIGS. 1 and 2. It comprises an ejection device 8 with an opening 8a, where the solid fertilizer 6 is conveyed to a deflection plate 8c, where the trajectories of the solid fertilizer 6 that in this case may be fertilizer granules 6 are deflected and they are distributed onto the working area 2 of the field 1.

The spreading characteristics, e.g. the area onto which the solid fertilizer 6 is spread and how evenly it is spread, are substantially determined by the properties of the deflection plate 8c and can be changed by the presence of the liquid fertilizer additive 7 on the plate 8c. Therefore, it needs to be protected and kept dry. As described with reference to FIG. 5 for the centrifugal spreader 4, the pneumatic spreader 4 is also arranged on the vehicle 3 and oriented so that the liquid fertilizer additive 7, once it leaves the nozzles 5a of the field sprayer 5, does not reach the ejection device 8.

As mentioned above the fertilizer 7 may be solid or liquid. If the fertilizer 7 is solid and the fertilizer additive 7 is liquid the field sprayer 5 is arranged relatively to the fertilizer spreading device 4 so that the liquid fertilizer additive 7 is prevented from coming into contact with surfaces of the fertilizer spreading device 4, which also come into contact with the solid fertilizer 6.

If, according to the second embodiment, both the fertilizer additive 7 and the fertilizer 6 are liquid the field spreader 5 might not be arranged relatively to the fertilizer spreading device 4 so that the liquid fertilizer additive 7 is prevented from coming into contact with surfaces of the fertilizer spreading device 4, which also come into contact with the fertilizer 6. In the second embodiment the control unit 11 preferably controls the rates of spreading the fertilizer 6 and the fertilizer additive 7 on the working area 2 as a function of the vehicle's 3 geographical position as described below.

With reference to the FIGS. 1 through 6, the method according to the invention is described.

Again it is assumed for a first embodiment that the fertilizer additive 7 is liquid so that the field spreader 5 is a field sprayer 5 and that the fertilizer 6 is a solid nitrogen-containing fertilizer 6. However, in the second embodiment both the fertilizer additive 7 and the fertilizer 6 are liquid.

The vehicle 3 moves with the velocity v over the field 1 and spreads solid nitrogen-containing fertilizer 6, specifically urea 6 in granulate form, and a liquid fertilizer additive 7, specifically a urease inhibitor 7, onto the working area 2 of the field 1. To this end, the spreading and spraying rates, respectively, of the fertilizer spreading device 4, specifically the centrifugal spreader 4, and the field sprayer 5 are controlled by the control unit 11. The velocity sensor 9 measures the velocity v of the vehicle 3 and the geographical positioning means 10 determine the position of the vehicle 3. The control unit 11 uses these pieces of information partly or in total to control the absolute quantity and the ratio of fertilizer 6 and fertilizer additive 7 that are applied to the soil. Thus, the absolute quantities and relative ratio of solid fertilizer 6 and liquid fertilizer additive 7 are determined individually for each segment of the working area 2.

If the absolute quantities as well as the relative ratio of fertilizer additive 7 to fertilizer 6 are not known in advance, the optical sensor 12, the analyzing unit 13 and the calculating unit 14 may be used to calculate the respective amounts and the ratio of fertilizer additive 7 to fertilizer 6 in the field 1 while the vehicle 3 moves on the field 1. The control unit 11 then uses the calculated data of the calculating unit 14 to control the absolute quantity and the ratio of fertilizer additive 7 and fertilizer 6 that are applied to the soil.

The centrifugal spreader 4 and the field sprayer 5 are configured such that the liquid fertilizer additive 7 does not reach the centrifugal spreader 4. Therefore, their longitudinal distance is chosen as large as possible, specifically by mounting the centrifugal spreader 4 at the back of the vehicle 3 and the field sprayer 5 on the front of the trailer 3a in the direction of travel.

It is mentioned that any solid fertilizer 6 listed above and any liquid fertilizer additive 7 listed above may be used in this method.

The invention is now described on the basis of experimental data with reference to the graph shown in FIG. 7.

The efficiency of a urease inhibitor in reducing ammonia ($NH_3$) losses from three different soils treated with urea was measured. The time between the application of the urea fertilizer and the urease inhibitor was varied. Measurement methods to determine the nitrogen loss by ammonia volatilization are generally known (Fenn & Kissel, Ammonia volatilization from surface applications of ammonium compounds on calcareous soils. Soil Sci. So. Am. J. 37, 855-859).

The characteristics of the soils and the dates of the experiments and measurements are given in table 1:

TABLE 1

Overview over the properties of the soils that were used in the experiments and the dates of experiments and measurements

|  | Limburgerhof | Reithofen | Aich |
|---|---|---|---|
| Soil quality rating | 30 | 75 | 48 |
| Soil texture (0-30 cm) | sand | loamy silt | loamy silt |
| pH (0-30 cm) | 6.8 | 6.9 | 6.6 |
| $P_2O_5$ (mg/100 g soil, 0-30 cm) | 17 | 16 | 3 |
| $K_2O$ (mg/100 g soil, 0-30 cm) | 8 | 23 | 11 |
| Mg (mg/100 g soil, 0-30 cm) | 5 | 11 | 12 |
| Free lime (%, 0-30 cm) | 0.5 | <0.3 | <0.3 |
| Precrop | winter rye | winter wheat | winter wheat |
| Test crop | Grain maize | Grain maize | Grain maize |
| $N_{min}$ (kg N/ha, 0-90 cm) | 69 | 83 | 57 (0-60 cm) |
| Seeding date | 24th April | 29th April | 27th April |
| Fertilizer application | 15th May | 22nd May | 22nd May |
| 1st $NH_3$ sampling | 22nd May | 29th May | 29th May |
| 2nd $NH_3$ sampling | 29th May | 5th June | 5th June |

A solid urea fertilizer was spread on the different soils and a urease inhibitor (LIMUS®) was sprayed. Different time intervals between the application of urea and the urease inhibitor were tested: The urease inhibitor was applied 3, 2 and 1 days before (treatments no. T2 to T4) or after (treatments no. T9 to T11) urea was spread, respectively. Additionally, the inhibitor was applied to the field just before (treatment no. T5) and just after (treatment no. T8) urea was spread. The expression "just before" or "just after" means within some minutes. For the control measurements, urea was spread without any urease inhibitor present (treatment no. T6; negative control) and premixed with urea granules treated with urease inhibitor (application of a liquid urease inhibitor formulation on surface of urea granules) (treatment no. T7; positive control). The tested conditions are summed up in table 2:

TABLE 2

Protocol of the experiments

| Treatment no. | LIMUS solo ® [1] | N fertilizer |
|---|---|---|
| T1 | — | — |
| T2 | 3 days before N application | Urea |
| T3 | 2 days before N application | Urea |
| T4 | 1 day before N application | Urea |
| T5 | Just before N application | Urea |
| T6 | — | Urea |
| T7 | — | Urea + LIMUS ® [2] |
| T8 | Just after N application | Urea |
| T9 | 1 day after N application | Urea |
| T10 | 2 days after N application | Urea |
| T11 | 3 days after N application | Urea |

[1] application in 200 l water/ha with herbicide nozzles (0.37 kg LIMUS ®/ha)
[2] contains 0.12% LIMUS ® rel. to urea → 0.37 kg LIMUS ®/ha The parameters to be evaluated were the $NH_3$-emissions within 0-6 and 7-12 days after N fertilization. The results of the experiments are shown in table 3 and FIG. 7 (0-12 days):

TABLE 3

% NH$_3$-nitrogen loss of applied nitrogen from urea-treated soils with and without urease inhibitor (UI) wherein the UI was applied n days before, n days after or simultaneously with the urea fertilizer. "Just before" and "just after" denote a delay of few minutes, e. g. within 5 minutes. Measurements were made 12 days after urea treatment on each field.

|  | No UI | n = −3 | n = −2 | n = −1 | Just before | Simultaneously | Just after | n = +1 | n = +2 | n = +3 |
|---|---|---|---|---|---|---|---|---|---|---|
| Mean (% N loss) | 17.0 | 8.9 | 6.0 | 3.7 | 2.1 | 1.6 | 1.7 | 2.9 | 4.6 | 8.8 |
| Limburgerhof (% N loss) | 16.8 | 16.9 | 13.0 | 6.7 | 3.1 | 2.1 | 1.7 | 4.9 | 4.7 | 9.5 |
| Reithofen (% N loss) | 20.6 | 6.8 | 3.5 | 3.5 | 2.2 | 2.0 | 2.6 | 2.7 | 6.6 | 12.5 |
| Aich (% N loss) | 13.5 | 3.0 | 1.4 | 0.9 | 0.9 | 0.7 | 0.8 | 1.0 | 2.4 | 4.4 |

The graph in FIG. 7 shows the relative loss of nitrogen within the first six days after urea treatment (A), within the six days after that period (B) and the total of relative loss of nitrogen within twelve days after urea treatment for treatments no. T2 to T11, respectively.

The mean loss of nitrogen from ammonia volatilization without the application of the urease inhibitor is 17% of the originally spread nitrogen. The urease inhibitor, if applied simultaneously with the urea fertilizer, reduces this value to 1.6%. However, if the urease inhibitor is applied to the soil short before or after spreading the urea is spread, the NH$_3$-loss is similarly reduced to 2.1 and 1.7%, respectively. This result is surprising in the perspective of the general opinion that spraying the urease inhibitor onto the field would be too unspecific to affect the ammonia volatilization significantly. Increasing the time between spreading the urea fertilizer and applying the urease inhibitor increases the NH$_3$-loss.

Thus, if applying a solid nitrogen-containing fertilizer and a liquid fertilizer additive separately, reducing the time span between the spreading of the solid fertilizer and applying the liquid fertilizer additive to below 1 h, preferably to few minutes, in particular below 5 minutes, is important to ensure the most efficient effect of the urease inhibitor.

LIST OF REFERENCE SIGNS

1 Field
2 Working area
3 Vehicle
4 Fertilizer spreading device; centrifugal spreader; pneumatic spreader
5 Field sprayer; field spreader
5a Nozzle
6 Fertilizer; urea granulate
6a Solid fertilizer reservoir
7 Liquid fertilizer additive; urease inhibitor
7b Liquid fertilizer additive reservoir
8 Ejection device
8a Ejection opening
8b Rotating disk
8c Deflection plate
9 Velocity sensor
10 Geographical locating means
11 Control unit
12 Optical sensor
13 Analyzing unit
14 Calculating unit
v Velocity of the vehicle 3

The invention claimed is:

1. A method for applying an agrochemical mixture to a working area of a field using a vehicle moving on the field, the method comprising:
   detecting electromagnetic radiation emitted from plants on the working area of the field;
   analyzing the detected electromagnetic radiation to obtain a nitrogen status value for each segment of a plurality of segments of the field;
   calculating a ratio of liquid fertilizer additive to solid nitrogen-containing fertilizer for each segment of the field as a function of the obtained nitrogen status value for the respective segment;
   spreading the solid nitrogen-containing fertilizer on the working area using a solid fertilizer spreading device mounted on the vehicle; and
   spraying the calculated ratio of the liquid fertilizer additive to each segment of the field using a field sprayer mounted on the vehicle separately from the solid fertilizer spreading device,
   wherein the liquid fertilizer additive is prevented from coming into contact with surfaces of the solid fertilizer spreading device, which also come into contact with the solid fertilizer.

2. The method according to claim 1, further comprising:
   measuring a speed of the vehicle; and
   controlling rates of spreading the solid fertilizer and spraying the liquid fertilizer additive on the working area as a function of the speed of the vehicle and a longitudinal distance between an ejection opening of the solid fertilizer spreading device and a nozzle of the field sprayer such that a predetermined quantity of the solid fertilizer and a predetermined quantity of the liquid fertilizer additive are applied to the working area.

3. The method according to claim 1, further comprising:
   determining a geographical position of the vehicle; and
   controlling rates of spreading the solid fertilizer and spraying the liquid fertilizer additive on the working area as a function of the geographical position of the vehicle on the field.

4. The method according to claim 1, wherein the liquid fertilizer additive comprises at least one of a nitrification inhibitor, a urease inhibitor, and a denitrification inhibitor.

5. A vehicle for applying an agrochemical mixture to a working area of a field while moving on the field, the vehicle comprising:
   an optical sensor for detecting electromagnetic radiation emitted from plants on the working area of the field;

an analyzing unit for obtaining a nitrogen status value for each segment of a plurality of segments of the field based on the detected electro-magnetic radiation;

a calculating unit for calculating a ratio of liquid fertilizer additive to solid fertilizer for each segment of the field as a function of the obtained nitrogen status value for the respective segment;

a control unit that controls application of the calculated ratio of liquid fertilizer additive to solid fertilizer to each segment of the field;

a solid fertilizer spreading device mounted on the vehicle for spreading a solid fertilizer on the working area; and a field sprayer mounted on the vehicle separately from the solid fertilizer spreading device, for spraying a liquid fertilizer additive on the working area, wherein the field sprayer is arranged relative to the solid fertilizer spreading device such that the liquid fertilizer additive is prevented from coming into contact with surfaces of the solid fertilizer spreading device, which also come into contact with the solid fertilizer.

6. The vehicle according to claim 5, wherein:

the solid fertilizer spreading device comprises at least one ejection device having an ejection opening, and the field sprayer is arranged on the vehicle at a distance from the ejection opening and in a direction relative to the ejection opening such that the liquid fertilizer additive, when sprayed, does not reach the ejection opening.

7. The vehicle according to claim 5, wherein the solid fertilizer spreading device is arranged at a rear of the vehicle in a direction of travel, and the field sprayer is arranged at a front of the vehicle in the direction of travel.

8. The vehicle according to claim 5, further comprising:

a sensor to measure a speed of the vehicle;

a control unit that controls rates of spreading the solid fertilizer and spraying the liquid fertilizer additive on the working area as a function of the speed of the vehicle and a longitudinal distance between an ejection opening of the solid fertilizer spreading device and a nozzle of the field sprayer such that a predetermined quantity of solid fertilizer and a predetermined quantity of liquid fertilizer additive are applied to the working area of the field.

9. The vehicle according to claim 5, further comprising:

geographical locating means coupled to a control unit, wherein the control unit is adapted to control rates of spreading the solid fertilizer and spraying the liquid fertilizer additive on the working area as a function of a geographical position of the vehicle.

10. A method for applying an agrochemical mixture to a working area of a field using a vehicle moving on the field, the method comprising:

detecting electromagnetic radiation emitted from plants on the working area of the field;

analyzing the detected electromagnetic radiation to obtain a nitrogen status value for each segment of a plurality of segments of the field;

calculating a ratio of a fertilizer additive to a fertilizer for each segment of the field as a function of the obtained nitrogen status value for the respective segment;

spreading the fertilizer on the working area using a fertilizer spreading device mounted on the vehicle;

determining a geographical position of the vehicle; and applying the calculated ratio of fertilizer additive to the fertilizer additive to each segment of the field depending on the determined geographical position of the vehicle on the field, wherein the fertilizer additive is applied using a field spreader mounted on the vehicle separately from the fertilizer spreading device.

11. The method according to claim 10, wherein further comprising:

measuring a speed of the vehicle;

controlling rates of spreading the fertilizer and spreading the fertilizer additive on the working area as a function of the speed of the vehicle and a longitudinal distance between the fertilizer spreading device and the field spreader such that a predetermined quantity of fertilizer and fertilizer additive, respectively, is applied to the working area of the field.

12. A vehicle for applying an agrochemical mixture to a working area of a field while moving on the field, the vehicle comprising:

an optical sensor for detecting electromagnetic radiation emitted from plants on the working area of the field;

an analyzing unit for obtaining a nitrogen status value for each segment of a plurality of segments of the field based on the detected electro-magnetic radiation;

a calculating unit for calculating a ratio of a fertilizer additive to a fertilizer for each segment of the field as a function of the obtained nitrogen status value for the respective segment;

a control unit that controls application of the calculated ratio of fertilizer additive to fertilizer to each segment of the field;

a fertilizer spreading device mounted on the vehicle for spreading the fertilizer on the working area;

a field spreader mounted on the vehicle separately from the fertilizer spreading device for spreading the fertilizer additive on the working area;

a control unit that controls rates of spreading the fertilizer and the fertilizer additive on the working area; and geographical locating means coupled to the control unit, wherein the control unit is adapted to control the rates of spreading the fertilizer and the fertilizer additive on the working area as a function of a geographical position of the vehicle.

* * * * *